Figure 1:
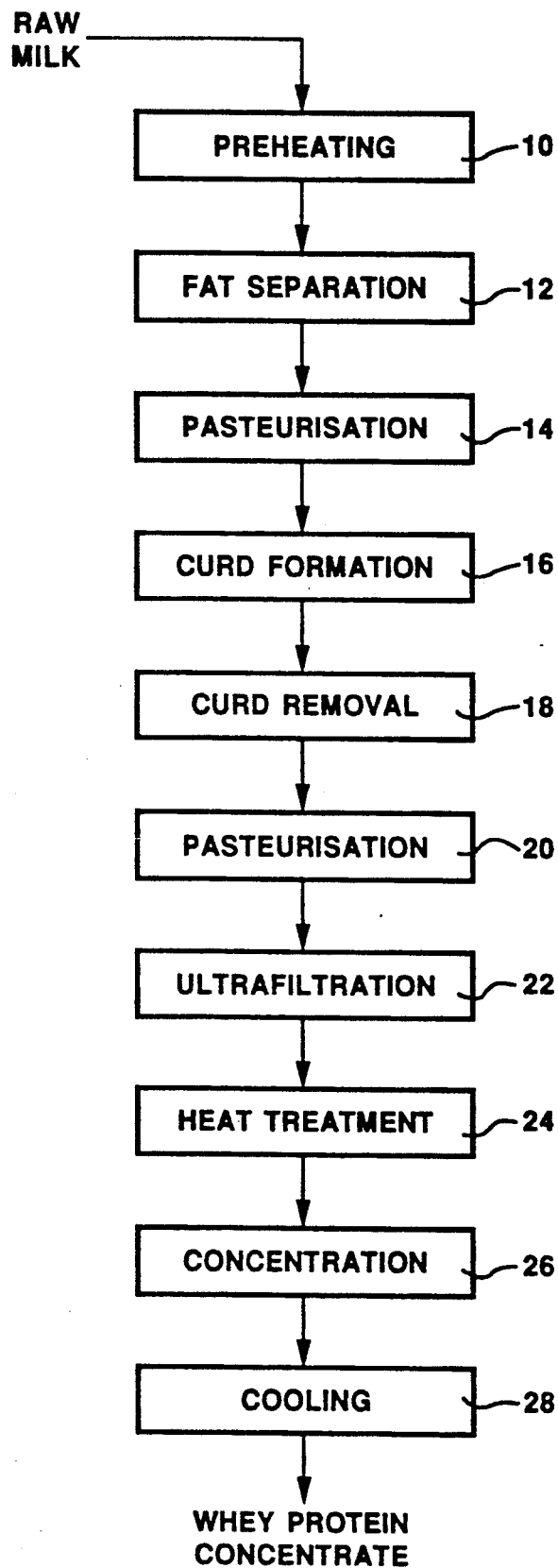

United States Patent [19]

Asher et al.

[11] Patent Number: 5,215,777
[45] Date of Patent: Jun. 1, 1993

[54] PROCESS FOR PRODUCING LOW OR NON FAT ICE CREAM

[75] Inventors: Yashavantkumar J. Asher; Martha A. Mollard; Suzette Jordan; Terry J. Maurice, all of London; Karen B. Caldwell, Belmont, all of Canada

[73] Assignee: Ault Foods Limited, Etobicoke, Canada

[21] Appl. No.: 750,657

[22] Filed: Aug. 27, 1991

Related U.S. Application Data

[63] Continuation-in-part of Ser. No. 739,215, Aug. 1, 1991, abandoned, which is a continuation-in-part of Ser. No. 700,856, May 16, 1991, abandoned.

[51] Int. Cl.$^5$ .................................................. A23C 9/00
[52] U.S. Cl. ........................................ 426/565; 426/567; 426/658; 426/660
[58] Field of Search ............... 426/565, 567, 583, 658, 426/660, 804

[56] References Cited

U.S. PATENT DOCUMENTS

| | | | |
|---|---|---|---|
| 2,548,865 | 4/1951 | Burt | 426/567 |
| 4,840,813 | 6/1989 | Greenberg et al. | 426/583 |
| 4,855,156 | 8/1989 | Singer et al. | 426/565 |
| 4,935,258 | 6/1990 | Wade et al. | 426/565 |
| 4,954,360 | 9/1990 | Barnett | 426/567 |

Primary Examiner—R. B. Penland
Attorney, Agent, or Firm—Fisher, Christen & Sabol

[57] ABSTRACT

Low or non-fat ice cream contains less than about 5% by weight fat and comprises (by weight except where otherwise stated) from about 5 to about 15% milk solids non-fat, from about 5 to about 20% sweeteners, from about 0.1 to about 0.5% stabilizers and, at a temperature in the range of from about $-12°$ to about $-10°$ C., from about 45 to about 60% frozen water in the form of ice crystals, at least about 40% (by number) of said ice crystals having a diameter less than about 45 microns, and from about 10 to about 20% unfrozen water.

7 Claims, 5 Drawing Sheets

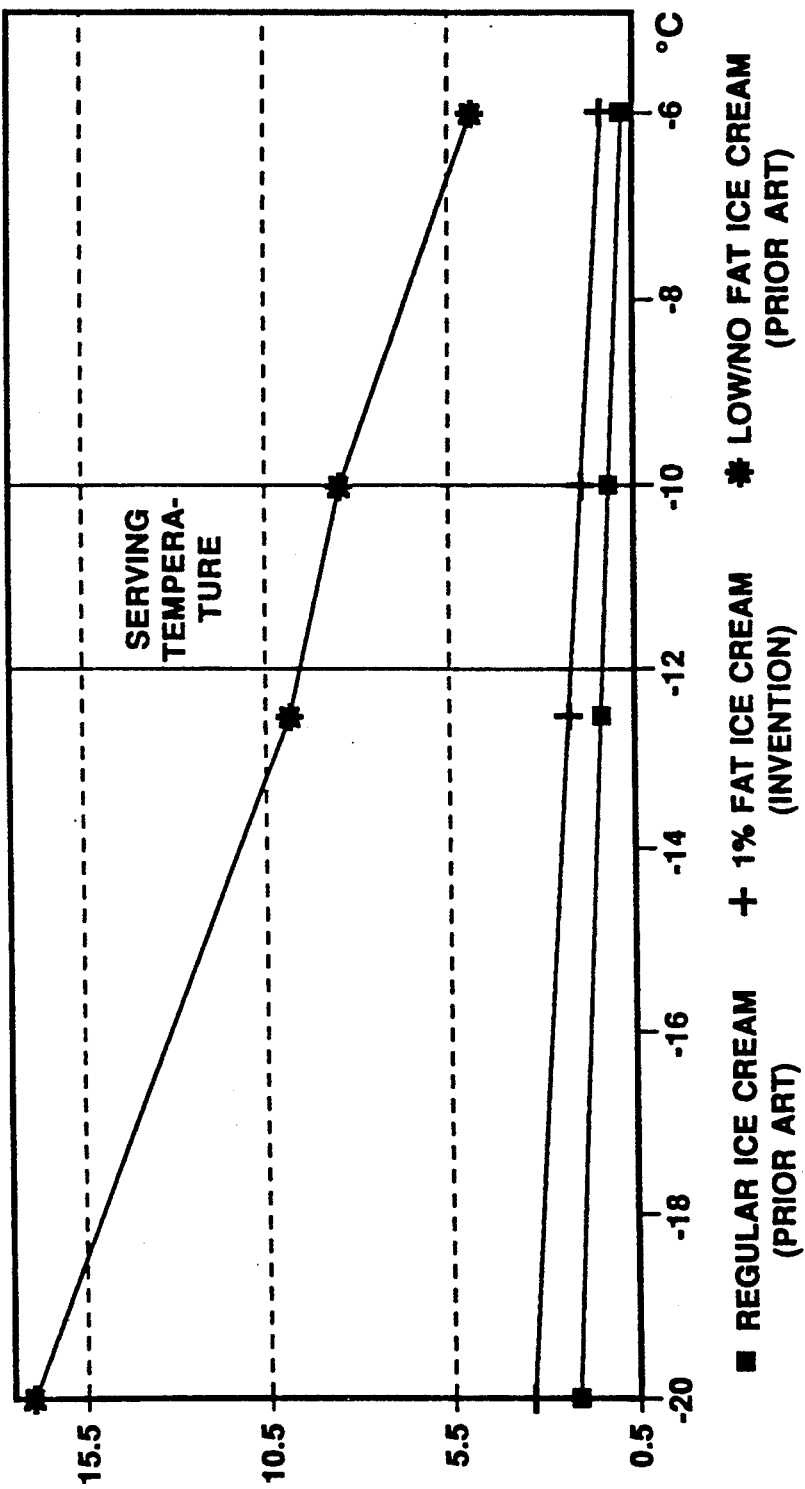

PROCESS FOR PRODUCING LOW OR NON FAT ICE CREAM

This is a continuation-in-part of application Ser. No. 739,215 filed Aug. 1, 1991, now abandoned, which is a continuation-in-part of application Ser. No. 700,856 filed May 16, 1991, now abandoned.

This invention relates to low and non-fat ice cream. In this application, low fat ice cream means ice cream containing less than about 5% by weight fat. Such ice cream is sometimes known as low and non-fat frozen dairy dessert. Ice cream containing more than about 5% by weight fat will be referred to in this application as regular ice cream. A typical regular ice cream contains (by weight) about 10% fat, about 11% milk solids non fat, about 18% sweeteners, about 0.25% stabilizers/emulsifiers, and, at a serving temperature of from about −12° to about −10° C., about 49% frozen water and about 11.75% unfrozen water.

Many attempts have been made to produce low and non-fat ice cream which has the desirable characteristics of regular ice cream, see for example U.S. Pat. No. 4,840,813 (Greenberg et al.), particularly the description of prior art in the opening paragraphs thereof. However, low and non-fat ice cream produced in the past tends to have undesirable characteristics, for example icy and crumbly texture, weak body, aftertaste, gummy mouth-feel, poorly balanced flavour and poor meltdown and scooping properties.

Prior attempts to reproduce the desirable characteristics of regular ice cream have been based on trying to mimic the smooth and creamy texture produced by fat and stabilizers in regular ice cream. Thus, low and non-fat ice cream has tended to contain ingredients intended to have a fat-like mouth-feel and/or relatively higher amounts of stabilizers (and probably also emulsifiers) than regular ice cream. This has led to the undesirable characteristics mentioned in the preceding paragraph.

The present invention is based on a different approach to the problem.

The present invention evolves from consideration of the characteristics of the water content (both frozen and unfrozen) of regular ice cream. At a serving temperature in the range of from −12° to about −10° C., regular ice cream such as the 10% fat ice cream mentioned earlier usually contains (by weight) about 50% frozen water in the form of ice crystals, with an average diameter of less than about 40 microns, and about 12% unfrozen water. The present invention takes into account the realization that the amount of frozen water, the size of the ice crystals and the amount of unfrozen water significantly affect the mouth-feel of the ice cream when eaten. When the frozen water (ice crystals) melts in the mouth, the heat required is obtained from the mouth. The amount of heat required is a significant factor in the determination of whether or not the ice cream is liked by the consumer. The size of the ice crystals is also another significant factor in this respect. For example, if a significant number of ice crystals are greater than about 60 to 70 microns in mean diameter, the consumer will perceive the product as icy. The amount of unfrozen water also affects the mouth-feel, for example the sensation of creaminess.

In contrast to prior art low and non-fat ice cream, the present invention is concerned with providing a low or non-fat ice cream in which the amount of frozen water, the size of the ice crystals and the amount of unfrozen water at a serving temperature in the range of from about −10° to about −12° C. resemble that of a regular ice cream. Another concern is to minimize the amount of stabilizers to avoid undesirable characteristics produced by relatively high amounts of stabilizers frequently found in prior art low and non-fat ice creams.

According to the present invention, low and non-fat ice cream contains less than about 5% by weight fat and comprises (by weight except where stated) from about 5 to about 15% milk solids non-fat, from about 5 to about 20% sweeteners, from about 0.1 to about 0.5% stabilizers and, at a temperature in the range of from about −12° to about −10° C., from about 45 to about 60% frozen water in the form of ice crystals, at least about 40% (by number) of said ice crystals having a diameter less than about 45 microns, and from about 10 to about 20% unfrozen water. Preferably, the ice cream contains from about 7 to about 11% milk solids non-fat, and at least about 55% (by number) of the ice crystals have a diameter less than about 45 microns.

A process for making low or non-fat ice cream in accordance with the invention comprises forming an aqueous ice cream mix containing (by weight percent solids) from about 2 to about 7% whey protein concentrate, said whey protein concentrate solids containing from about 30 to about 40% protein, and the mix also containing (by weight percent solids) from about 1 to about 10% skim milk solids, from about 5 to about 8% sucrose solids, from about 2 to about 6% corn syrup solids, from about 7 to about 12% high fructose corn syrup solids, from about 0.01 to about 0.05% carrageenan and from about 0.01 to about 0.25% guar gum, and processing said mix to form ice cream. The whey protein concentrate and the skim milk solids provide the milk solids non-fat.

Advantageously, the whey protein in the whey protein concentrate utilized in the mix is at least 50% denatured relative to raw milk. Preferably from about 50 to about 90%, and more preferably from about 60 to about 80%, of the whey protein is denatured. The percent denaturation referred to in this application is the percent denatured relative to raw milk measured by the methodology described at the end of this specification.

Figure 2:
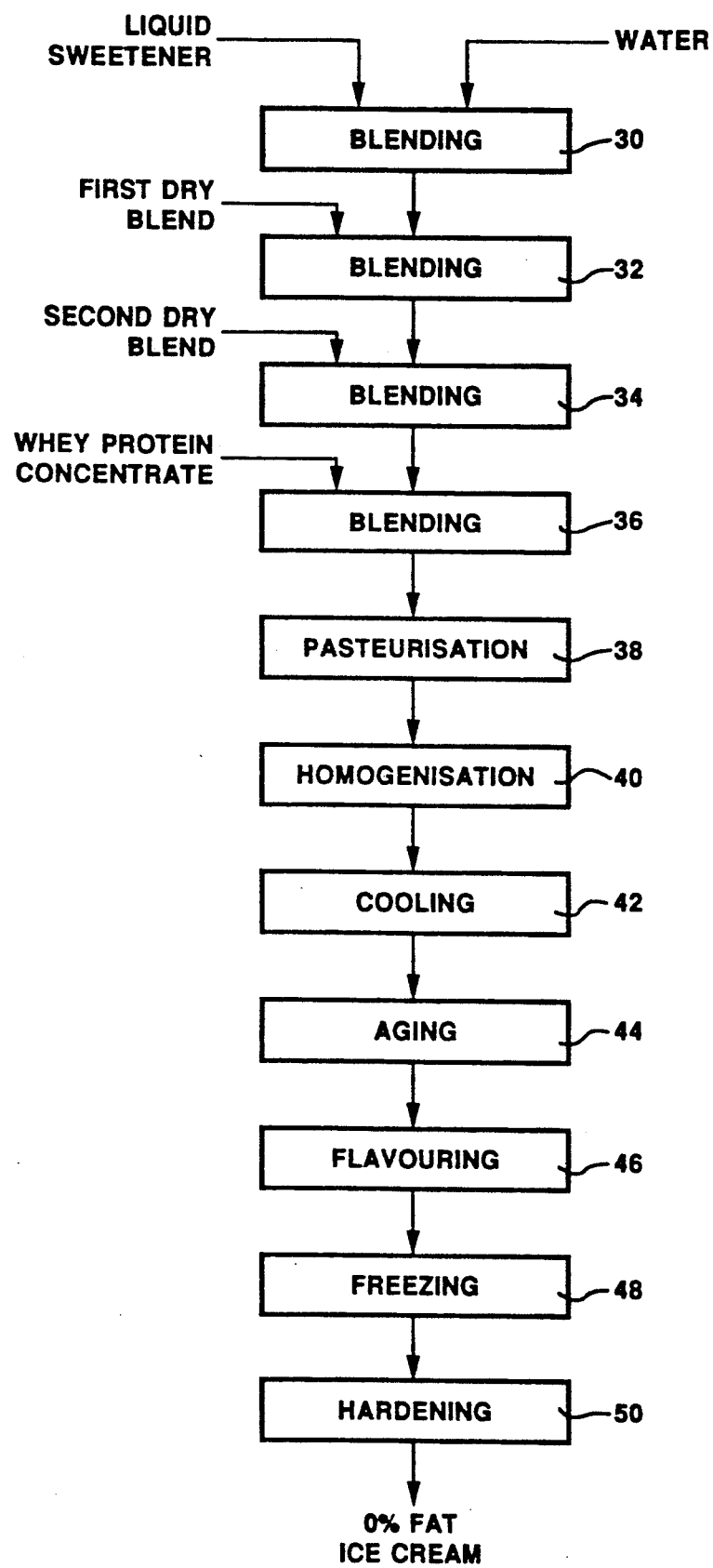
Figure 3:
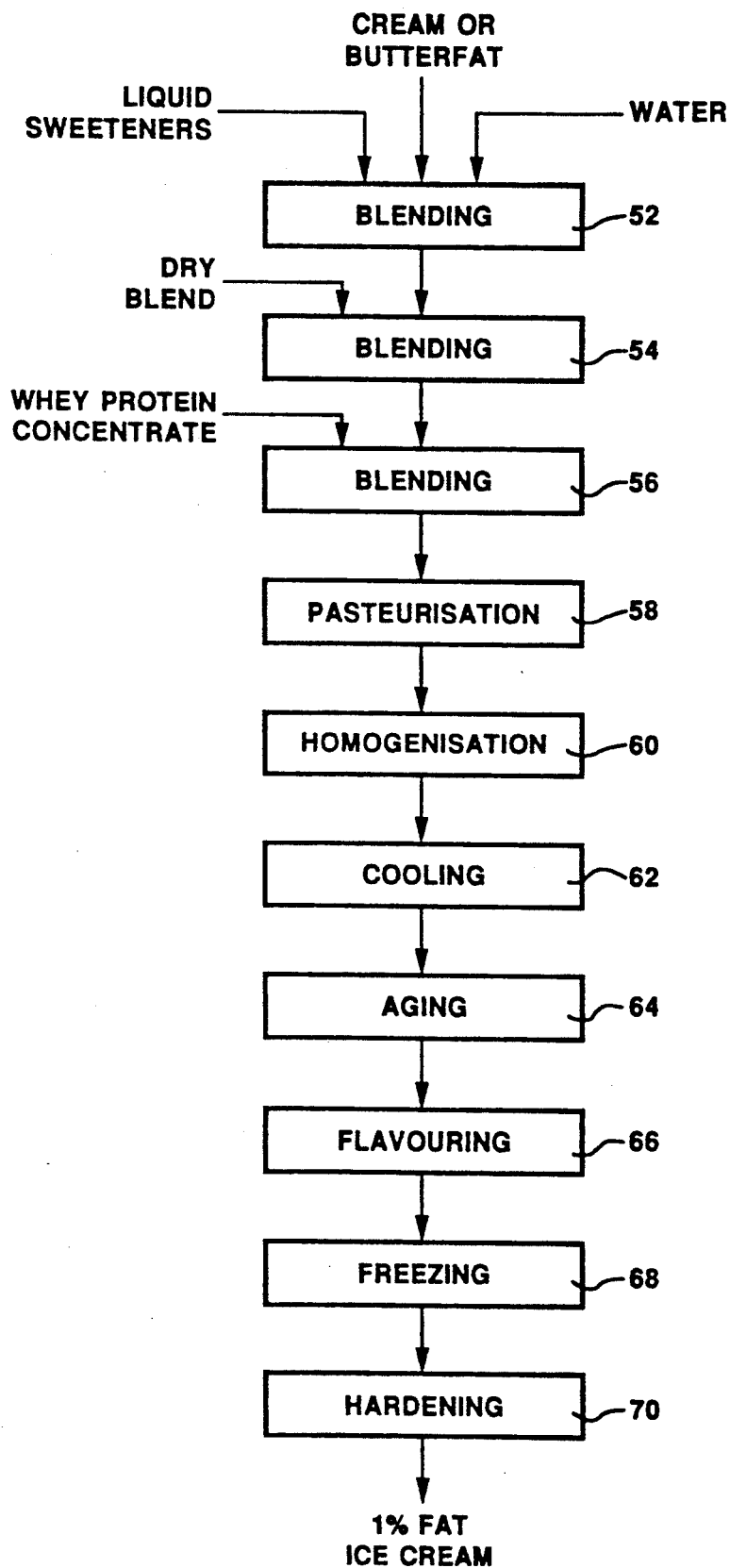
Figure 4:
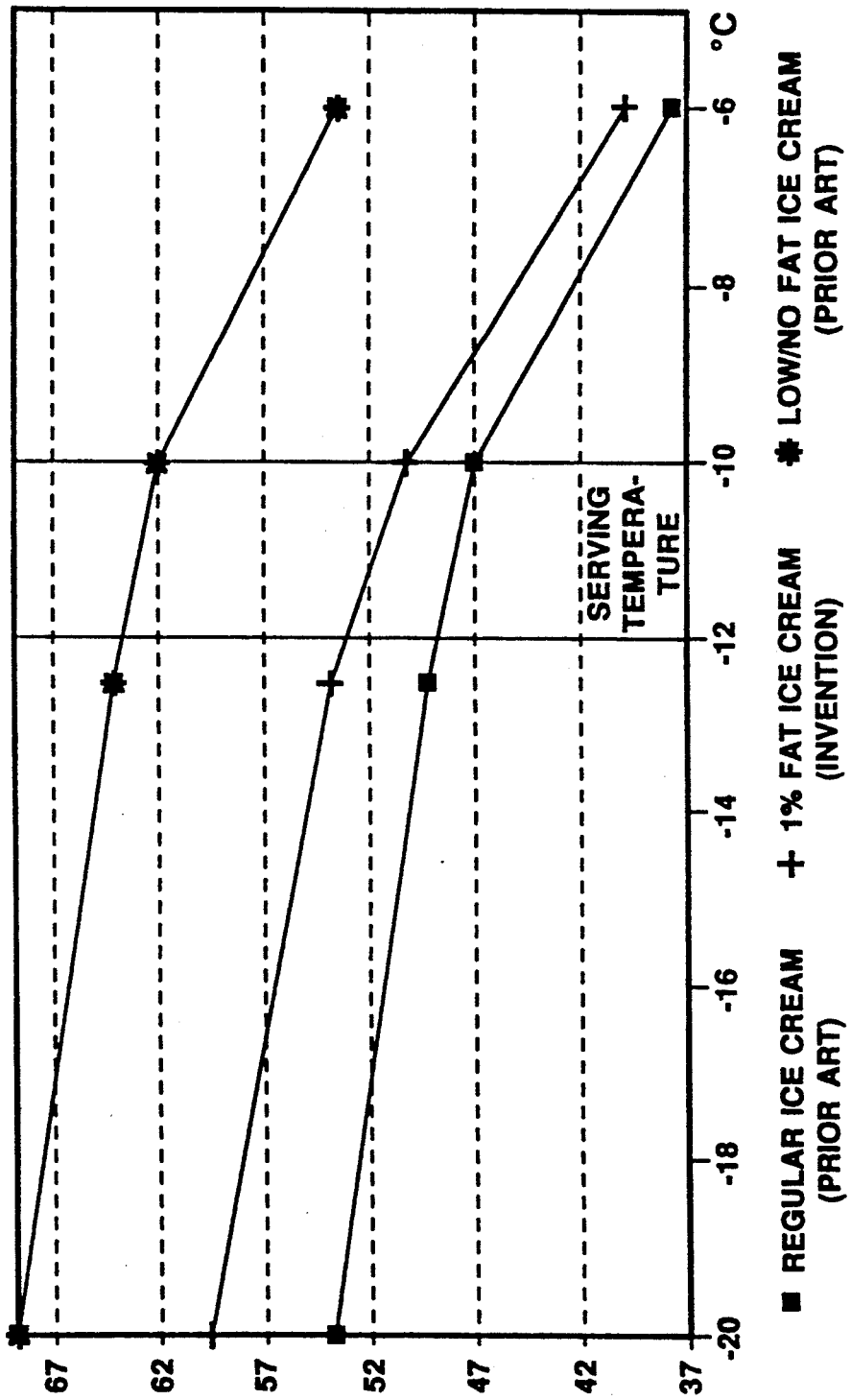

Preferred embodiments and examples of the invention will now be described, by way of example only, with reference to the accompanying drawings, of which:

FIG. 1 is a schematic view of a process for producing cheese and also whey protein concentrate in accordance with the invention, FIG. 2 is a schematic view of a process for making 0% fat ice cream in accordance with the invention, FIG. 3 is a schematic view of a process for making 1% (by weight) fat ice cream in accordance with the invention, FIG. 4 is a graph showing how the amount of frozen water in 1% fat ice cream produced by the process illustrated in FIG. 3 varies with temperature, with the amounts for a typical regular ice cream and typical prior art low or non-fat ice cream also being shown, and FIG. 5 is a graph showing how the effective concentration of stabilizers, i.e. the concentration in unfrozen water, in the 1% fat ice cream varies with temperature, with effective stabilizer concentrations for the regular ice cream and prior art low or non-fat ice cream also being shown.

Referring to FIG. 1, which shows the preparation of whey protein concentrate in accordance with a preferred embodiment of the invention, raw milk at a temperature of from about 3° to about 6° C. is preheated in a preheating step 10 to a temperature of from about 43° to about 49° C. and then passed to a fat separation step 12 where some fat is separated, the actual amount depending upon the type of cheese to be produced. The preheated fat-reduced milk is then pasteurised in a pasteurisation step 14 at a temperature of about 73° C. for about 20 seconds, with subsequent cooling to a temperature of from about 32° to about 38° C. The pasteurised fat-reduced milk then passes to a curd forming step 16 where lactic culture is injected and rennet is added in known manner and the contents are cooked and cut to produce curd.

The resultant curd/whey slurry is pumped to curd removal step 18 where raw whey is drained off at a temperature of from about 38° to about 41° C. The curd is subsequently processed into cheese in any desired manner. At this stage, the protein in the whey is from about 5 to about 10% denatured, relative to the raw milk, most of the denaturation having occurred when the milk was pasteurised in the pasteurisation step 14.

The whey from curd removal step 18 is pumped to pasteurisation step 20 where further pasteurisation occurs at a temperature of about 74° C. for about 30 seconds, with subsequent cooling to a temperature of from about 50° to about 52° C. This treatment causes further denaturation of the protein such that the protein is then from about 10 to about 15% denatured relative to the raw milk. The pasteurised whey is pumped to an ultrafiltration step 22 where the whey is ultrafiltered with a membrane having a nominal molecular weight cut-off of 5,000. The permeate from ultrafiltration step 22 may be used as desired. Most of the lactose in the whey will be in the permeate.

The retentate, namely ultrafiltered whey with about 9% total solids by weight, is pumped to a heat treatment step 24 where it is subjected to high heat treatment in a plate heat exchanger at a temperature of about 80° C. for about 17 seconds. Further denaturation occurs during the stage such that the protein in the whey is from about 60 to about 80% denatured relative to the raw milk. The pasteurised ultrafiltered whey proceeds to a concentration step 26 where evaporation is carried out at a temperature of about 69° C. under a vacuum of about 23 inches Hg to concentrate the total solids content to from about 30 to about 32% by weight. After concentration step 26, the whey cooling step 28.

The denaturation of the whey protein concentrate produced in accordance with the process described above can be controlled so as to be at a value in accordance with the invention by varying the temperature and/or time in high heat treatment step 24.

Referring now to FIG. 2, a process for preparing 0% fat ice cream in accordance with a preferred embodiment of the invention includes blending liquid sweetener, namely high fructose corn syrup, and water in a blending step 30. The resultant blend from blending step 30 is then blended with a first dry blend in a blending step 32, the first dry blend comprising skim milk solids, sweeteners, namely corn syrup solids and dry sugar, and bulking agents, namely tapioca starch and maltodextrin. The resultant blend from blending step 32 is blended with a second dry blend in blending step 34, the second dry blend comprising stabilizers, namely guar gum, carrageenan, locust bean gum, micro-crystalline cellulose gum, carboxy-methyl cellulose gum and xanthan gum and emulsifiers, namely mono-diglycerides. The resultant blend of dairy ingredients, sweeteners, bulking agents, stabilizers and emulsifiers from blending step 34 is then blended in a blending step 36 with whey protein concentrate from the process described with reference to FIG. 1 to form an ice cream mix.

The ice cream mix from blending step 36 is pasteurised in a pasteurisation step 38 at about 78° C. for about 10 minutes and is then homogenized in a two-stage homogenization step 40. The first stage is carried out at a pressure of about 2500 p.s.i. and the second stage is carried out at a pressure of about 800 p.s.i. The homogenized blend is then cooled in a cooling step 42 to about 4° C., and the cooled blend is then aged for about 24 hours in an aging step 44.

The aged blend is passed to a flavouring step 46 where appropriate flavouring is added, and the flavoured blend is frozen and whipped with an overrun (i.e. increase in volume due to air content) of from about 40 to about 80% in a freezing step 48 to produce 0% fat ice cream which is then extruded from the freezing step 48 at about −6° C. The ice cream is then hardened in a hardening step 50 until a core temperature (in a two liter container) of about −18° C. is reached, this being in about 2 hours.

By way of example, preferred ranges of the ingredients for 0% fat ice cream are as follows:

| Ingredients | Percent Solids By Weight Of Total Mix |
|---|---|
| Water | to make up 100% |
| High Fructose Corn Syrup | 7 to 12 |
| First Dry Blend | |
| Skim Milk Solids | 1 to 10 |
| Corn Syrup Solids | 2 to 6 |
| Dry Sugar | 5 to 8 |
| Tapioca Starch | 0 to 2.5 |
| Maltodextrin | 0 to 4 |
| Second Dry Blend | |
| Guar Gum | 0.04 to 0.15 |
| Carrageenan | 0.03 to 0.08 |
| Locust Bean Gum | 0 to 0.18 |
| Micro-crystalline Cellulose Gum | 0 to 0.18 |
| Carboxy-methyl-cellulose Gum | 0 to 0.4 |
| Xanthan Gum | 0 to 0.1 |
| Mono-diglycerides | 0 to 0.1 |
| Whey Protein Concentrate | |
| From about 30 to about 40% protein by weight on a total solids basis - 60 to 80% Denatured 25 to 40% solids by weight | 2 to 7 |

In a specific example of the invention, the following ingredients for 0% fat ice cream were used:

| Ingredients | Percent Solids By Weight Of Total Mix |
|---|---|
| Water | to make up 100% |
| High Fructose Corn Syrup | 10.00 |
| First Dry Blend | |
| Skim Milk Solids | 3.00 |
| Corn Syrup Solids | 4.00 |
| Dry Sugar | 4.75 |
| Tapioca Starch | 2.00 |
| Maltodextrin | 3.00 |
| Second Dry Blend | |
| Guar Gum | 0.12 |
| Carrageenan | 0.05 |
| Locust Bean Gum | 0.15 |
| Micro-crystalline Cellulose Gum | 0.16 |

| Ingredients | Percent Solids By Weight Of Total Mix |
|---|---|
| Carboxy-methyl-cellulose Gum | 0.03 |
| Xanthan Gum | 0.06 |
| Mono-diglycerides | 0.07 |
| Whey Protein Concentrate | |
| 35% protein by weight on a total solids basis - 71% Denatured 31% solids by weight | 7 |

The liquid blend is blended in a Lanco blender for two minutes at a speed of 1300 r.p.m. The first dry blend is then added slowly and blending is carried out for a further 5 minutes at the same speed. The second dry blend is then added and further blending is carried out for 5 minutes at the same speed. The speed is then reduced to 400 r.p.m., and the whey protein concentrate is added and further blending carried out for 2-3 minutes. The resultant blend is then treated in the manner described above with reference to FIG. 2.

At a serving temperature of $-12°$ C., the 0% fat ice cream described above contained 50% by weight frozen water in the form of ice crystals, 55% (by number) of which had a diameter less than 45 microns, and 16% by weight unfrozen water. The ice crystal size was measured in a manner which will be described later.

Referring now to FIG. 3, a process for preparing 1% fat (by weight) ice cream in accordance with a preferred embodiment of the invention includes blending liquid sweeteners, a dairy fat source such us cream and/or butter fat and water in a blending step 52, the liquid sweeteners comprising liquid sugar, liquid corn syrup solids and high fructose corn syrup. The resultant blend from blending step 52 is blended with a dry blend in a blending step 54, the dry blend comprising skim milk solids and stabilizers, namely guar gum, carrageenan, locust bean gum and micro-crystalline cellulose gum. The resultant blend of dairy ingredients (including fat), sweeteners and stabilizers from blending step 54 is then blended in a blending step 56 with whey protein concentrate from the process described with reference to FIG. 1 to form an ice cream mix.

The ice cream mix from blending step 56 is pasteurised in a pasteurisation step 58 at a temperature of about 82° C. for about 32 seconds and is then homogenized in a two-stage homogenization step 60. The first stage is carried out at a pressure of about 1800 p.s.i. and the second stage is carried out at a pressure of about 700 p.s.i. The homogenized blend is then cooled in a cooling step 62 to about 4° C. The cooled blend is then aged for about 24 hours in an aging step 64.

The aged blend then passes to a flavouring step 66 where appropriate flavour is added and the flavoured blend is frozen and whipped with an overrun of from about 40 to about 80% in a freezing step 68 to produce 1% fat ice cream which is then extruded from freezing step 68 at about $-6°$ C. The 1% fat ice cream is hardened in a hardening step 70 until a core temperature (in a two liter container) of about $-18°$ C. is reached, this being in about 2 hours.

By way of example, preferred ranges of ingredients for 1% (by weight) fat ice cream are as follows:

| Ingredients | Percent Solids By Weight Of Total Mix |
|---|---|
| Liquid Blend | |
| Liquid Sugar | 4 to 8 |
| Liquid Corn Syrup Solids | 2 to 6 |
| Water | to make up 100% |
| Cream/Butter Fat | 0.5 to 1.5 |
| High Fructose Corn Syrup | 7 to 12 |
| Dry Blend | |
| Skim Milk Solids | 1 to 10 |
| Carrageenan | 0.01 to 0.06 |
| Guar Gum | 0.01 to 0.12 |
| Locust Bean Gum | 0 to 0.14 |
| Micro-crystalline Cellulose Gum | 0 to 0.14 |
| Whey Protein Concentrate | |
| From about 30 to about 40% protein by weight on a total solids basis - 60 to 80% Denatured 25 to 40% solids by weight | 2 to 7 |

In a specific example of the invention, the following ingredients for 1% (by weight) fat ice cream were used:

| Ingredients | Percent Solids By Weight Of Total Mix |
|---|---|
| Liquid Blend | |
| Liquid Sugar | 4.75 |
| Liquid Corn Syrup Solids | 4.00 |
| Water | to make up 100% |
| Cream/Butter Fat | 0.65 |
| High Fructose Corn Syrup | 10.00 |
| Dry Blend | |
| Skim Milk Solids | 4.00 |
| Carrageenan | 0.04 |
| Guar Gum | 0.1 |
| Locust Bean Gum | 0.12 |
| Micro-Crystalline Cellulose Gum | 0.12 |
| Whey Protein Concentrate | |
| 35% protein by weight on a total solids basis - 71% Denatured 31% solids by weight | 7.0 |

The liquid blend is blended into a Lanco blender for about five minutes at a speed of about 1300 r.p.m. The dry blend is then added and further blending carried out for about five minutes at the same speed. The speed is then reduced to about 400 r.p.m., the whey protein concentrate is added and further blending carried out for 2-3 minutes. The resultant blend is then processed in the manner described above with reference to FIG. 3.

At a serving temperature of $-12°$ C., the 1% fat ice cream described above contained 53% by weight frozen water in the form of ice crystals, 58% (by number) of which had a diameter less than 45 microns, and 16.5% by weight unfrozen water. The ice crystal size was measured in a manner which will be described later.

FIG. 4 is a graph showing (in weight percent of the ice cream) the amount of frozen water in the 1% fat ice cream over a range of temperatures including the serving temperature range of from about $-12°$ to about $-10°$ C. Amounts of frozen water for a typical regular ice cream and a typical prior art low or non-fat ice cream are also shown. It will be noted that, over the temperature range shown, the amount of frozen water in the 1% fat ice cream in accordance with the invention corresponds more closely to that of the regular ice cream than to that of prior art low or non-fat ice cream. In fact, it will be noted that, over the serving temperature range of from about −12° to about −10° C., the amount of frozen water in the 1% fat ice cream is lower than that in the prior art low or non-fat ice cream at −6° C. (i.e. the temperature at which the 1% fat ice cream mix is extruded during the freezing step 68).

FIG. 5 is a graph showing the effective concentration of stabilizers, i.e. the concentration in unfrozen water, in the 1% ice cream over the same temperature range as FIG. 4. The amounts of effective stabilizer concentrations for the typical regular ice cream and the typical prior art low or non-fat ice cream are also shown. The effective concentration of the stabilizers decreases as temperature increases because the amount of unfrozen water increases. It will be noted that the effective stabilizer concentration for the 1% fat ice cream in accordance with the present invention corresponds more closely to that of regular ice cream than to that of the prior art low or non-fat ice cream.

The 0% fat ice cream and the 1% fat ice cream described above thus have characteristics which closely resemble the described characteristics of regular ice cream and are substantially free from the undesirable characteristics of prior art low and non-fat ice cream.

The quantities and nature of the various ingredients and the processing conditions can be varied by reasonable trial and experiment to vary the characteristics of low and non-fat ice cream in accordance with the invention.

For example, in addition to the previously mentioned ingredients, the ice cream mix may also contain the following ingredients (in weight percent solids of the mix):

| Ingredients | Percent Solids By Weight Of Total Mix |
|---|---|
| Whey Solids | 0–3 |
| Dextrose | 0–3 |
| Crystalline Fructose | 0–5 |
| Glycerine | 0–2 |
| Propylene Glycol | 0–2 |
| Mannitol | 0–3 |
| Sorbitol | 0–3 |
| Poly Dextrose | 0–3 |

MEASUREMENT OF SIZE OF ICE CRYSTALS

Ice cream is smeared in the frozen state onto a microscope slide and the ice crystal size is determined by using a light microscope. The method used is modified from that of Arbuckle (1960), as follows:

(1) Ice cream is tempered to −20° C. in a microtome for at least 6 hours prior to sampling. Utensils and microscope slides are all kept in the microstome at −20° C.

(2) Ice cream is smeared onto a microscope slide in the microtome and a drop of amyl alcohol/kerosene mixture (1:1) is added. The sample is covered with coverslip. Pressure is applied to the coverslip with the eraser end of a pencil to further spread the sample.

(3) The slide is quickly transferred onto a microscope stage held at −20° C. The microscope is in a closed environment to eliminate excessive condensation. The ice cream smears are photographed at magnifications ranging from 115 to 215 times depending on the age of the ice cream sample.

(4) The longest dimension (diameter) of each ice crystal is measured using a digitizing tablet, and the percentage by number of ice crystals with diameters less than 45 $\mu$m is recorded.

CALCULATION OF PERCENTAGE DENATURATION

The methodology for calculating the percentage denaturation of the whey protein concentrate will now be described.

In the broadest sense, denaturation of protein refers to any conformational change in the three dimensional structure of a protein away from its native state. For the purpose of this and in fact most methods which characterize denaturation, the conformational changes must result in a loss of solubility of the protein.

This method involves measuring the protein which remains in solution after a mechanical separation of the precipitated (denatured) portion.

This is a comparative method in which a reference sample is used as a point of "zero denaturation". In most cases, this reference will in fact be partially denatured to a degree which may or may not be known. What is being measured is the percent denaturation in the sample with respect to the reference.

Usually the denaturation of the sample in question is associated with a processing step such as a high heat treatment. In this case, the reference could simply be the sample prior to high heat treatment.

The reference sample is centrifuged to separate out the precipitated proteins. The protein which remains in solution is quantified by UV spectroscopy.

The reference is then completely heat denatured and precipitated proteins are separated by centrifugation. Again, the protein which remains in solution is quantified by UV spectroscopy.

The sample in question is then centrifuged and the protein in solution is measured by UV spectroscopy. By comparing the spectroscopic data for the sample to the data for the undenatured and completely denatured reference, a relative percent denaturation can be calculated.

ULTRAVIOLET SPECTROSCOPY

The amount of UV radiation which a sample absorbs is a function of the concentration of the absorbing components within the sample. This relationship is linear and can be expressed in terms of the Beer-Lambert law.

$$A = \epsilon b c$$

Where:
A = Absorbance
$\epsilon$ = Extinction Coefficient
b = Path Length
c = Concentration The extinction coefficient ($\epsilon$) is a constant for a given substance and the path (b) is a constant for a given cuvette.

For this method, the absorbances of the aromatic amino acids, tyrosine and tryptophan in the region of 280 nm are used to characterize the concentration of protein in solution. $\beta$-lactoglobulin and $\alpha$-lactalbumin contain these amino acids in different proportions.

Both tyrosine and tryptophan absorb in the 280 nm range. The broad peak which is seen in this region is therefore a composite of absorption peaks of these two amino acids. The two peaks can be viewed separately by looking at the first derivative of the wavelength scan.

Pure solutions of αLA and βLG are used to determine the extinction coefficients of each of these proteins. Accurately prepared mixtures containing different ratios of the two proteins are used to determine composite extinction coefficients for blends.

PERCENT DENATURATION

Once protein concentration in the sample ($C_{sample}$), the undenatured reference ($C_{zero}$), and the completely denatured reference ($C_{100\%}$) have been determined, the percent denaturation is determined by the following equation.

$$\%Denaturation = [(c_{zero} - c_{sample})/(c_{zero} - c_{100\%})] \times 100$$

SAFETY CONSIDERATIONS

This method does not involve any hazardous chemicals. Proper care should be exercised when using the superspeed centrifuge.

APPARATUS

1. Double Beam Scanning UV Spectrophotometer and Quartz Cuvettes (Shimadzu UV160U)
2. Superspeed Centrifuge and Tubes (approx. 25000 G)
3. Boiling Water-Bath
4. 250 ml volumetric flasks
5. Ice-Bath
6. Computer and Spectra-Calc, and RS-1 Software Packages

REAGENTS

1. Distilled Water
2. Purified α-lactalbumin (Sigma L-7269)
3. Purified β-lactoglobulin (Sigma L-0130)

PROCEDURE

1. Determination Of Extinction Coefficient For α-lactalbumin
   a) Accurately prepare a minimum of 5 solutions (10 ml each) of pure αLA ranging from 0.02 to 0.12% (w/w).
   b) Set up the parameters of the UV spectrophotometer as follows:
      Mode: Wavelength Scan
      Wavelengths: 400 to 230 nm
      Scanning Speed: Slow
   c) Run a baseline correction on the instrument using distilled water in the reference and sample holders.
   d) Scan each solution of αLA using distilled water as the reference.
   e) Accurately record the peak absorbance in the 280 nm region for each sample. (Use Spectra-Calc to determine peak A) (See "CALCULATIONS" section for determination of ε)

2. Determination Of Extinction Coefficient For β-lacto-globulin
   a) Accurately prepare a minimum of 5 solutions (10 ml each) of pure βLG ranging from 0.04 to 0.20% (w/w).
   b) Set up the parameters of the UV spectrophotometer as follows:
      Mode: Wavelength Scan
      Wavelengths: 400 to 230 nm
      Scanning Speed: Slow
   c) Run a baseline correction on the instrument using distilled water in the reference and sample holders.
   d) Scan each solution of βLG using distilled water as the reference.
   e) Accurately record the peak absorbance in the 280 nm region for each sample. (Use Spectra-Calc to determine Peak A) (See "CALCULATIONS" section for determination of ε)

3. Determination Of Composite Extinction Coefficients
   a) Accurately prepare 0.1% (w/w) solutions (25 ml of each) of pure αLA and βLG.
   b) Using these solutions, accurately prepare a minimum of 6 composite samples of varying protein ratios.
   c) Set up the parameters of the UV spectrophotometer as follows:
      Mode: Wavelength Scan
      Wavelengths: 400 to 230 nm
      Scanning Speed: Slow
   d) Run a baseline correction on the instrument using distilled water in the reference and sample holders.
   e) Scan each composite sample with distilled water as the reference. Using Spectra-Calc, determine the maximum peak intensities of the two main first derivative peaks. These peaks will be at approximately 293 and 286 nm. (See "CALCULATIONS" section for the determination of composite ε)

4a. Analysis Of Reference Sample (Zero Point)
   a) Accurately dilute a portion of the reference sample to a solids level of 0.4%.
   b) Centrifuge at room temperature for 20 minutes at approximately 25000 G.
   c) Set up the parameters of the UV spectrophotometer as follows:
      Mode: Wavelength Scan
      Wavelengths: 400 to 230 nm
      Scanning Speed: Slow
   d) Run a baseline correction on the instrument using distilled water in the reference and sample holders.
   e) Scan the supernatant using distilled water in the reference cuvette.
   f) Record the peak absorbance (280 nm) as well as the peak intensities of the two main first derivative peaks. (Use Spectra-Calc software)

4b. Analysis Of Reference Sample (100% Denaturation Point)
   a) Fill about 5 250 ml volumetrics with the reference sample.
   b) Place the flasks into a boiling water bath and remove 1 every twenty minutes.
   For Each Sample:
   c) Cool in an ice-bath and use distilled water to bring the volume back to 250 ml.
   d) Accurately dilute to 0.4% solids and centrifuge for 20 minutes at approximately 25000 G.
   e) Set up the parameters for the UV spectrophotometer as follows:
      Mode: Wavelength Scan
      Wavelengths: 400 to 230 nm
      Scanning Speed: Slow
   f) Run a baseline correction on the instrument using distilled water in the reference and sample holders.
   g) Scan the supernatant using distilled water in the reference cuvette.

h) Record the absorbance at 280 nm and the intensities of the two main first derivative peaks.
i) Continue testing samples until there is no further decrease in the absorbance at 280 nm, i.e. after about 60 minutes.

5. Analysis Of Unknown Sample
   a) Accurately dilute the sample to 0.4% solids.
   b) Centrifuge for 20 minutes at 25000 G.
   c) Set up the parameters of the UV spectrophotometer as follows:
      Mode: Wavelength Scan
      Wavelengths: 400 to 230 nm
      Scanning Speed: Slow
   d) Run a baseline correction on the instrument using distilled water in the reference and sample holders.
   e) Scan the supernatant using distilled water in the reference cuvette.
   f) Record the absorbance at 280 nm and the intensities of the two main first derivative peaks.

CALCULATIONS

1. Extinction Coefficient For $\alpha$-lactalbumin
   a) Plot a graph of peak absorbance as a function of concentration for the solutions of pure $\alpha$LA.
   b) Using RS-1, fit a linear function to the data using the following format:

$$Absorbance = e \times Concentration$$

c) $\epsilon_{\alpha LA} = e$

2. Extinction Coefficient For $\beta$-lactoglobulin
   a) Plot a graph of peak absorbance as a function of concentration for the solutions for pure $\beta$LG.
   b) Using RS-1, fit a linear function to the data using the following format:

$$Absorbance = e \times Concentration$$

c) $\epsilon_{LG} = e$

3. Composite Extinction Coefficient
   a) Plot a graph of the Ratio $\alpha LA/\beta LG$ as a function of the ratio of the first derivative peaks ($\mathring{A}_{293\,nm}/\mathring{A}_{286\,nm}$) for each of the composite protein samples.
   b) Using RS-1, fit a function to the data using the following format:

$$\alpha LA/\beta LG = a + [b \times (\mathring{A}_{293\,nm}/\mathring{A}_{286\,nm})]^n$$

determine: a, b, and n

4. Concentration Of Reference Sample (Zero Point)
   a) Calculate the ratio of the two main first derivative peaks.

$$\mathring{A}_{293\,nm}/\mathring{A}_{286\,nm}$$

b) Use this value in the equation derived in step 3 above to determine R, the ratio $\alpha LA/\beta LG$.
   c) Calculate the soluble protein concentration, $c_{(zero)}$, in the undenatured reference sample as follows:

$$c_{(zero)} = A/\{[1/(R+1)] \times \epsilon_{\beta LG}\} + \{[1-(1/R+1)\} \times \epsilon_{\alpha LA}\}$$

5. Concentration Of Reference Sample (100%)
   For the sample subjected to the longest heat treatment:
   a) Calculate the ratio of the two main first derivative peaks.

$$\mathring{A}_{293\,nm}/\mathring{A}_{286\,nm}$$

b) Insert this value into the equation derived in step 3 above to determine R, the ratio $\alpha LA/\beta LG$.
   c) Calculate the soluble protein concentration, $c_{(100\%)}$, in the undenatured reference sample as follows:

$$c_{(100\%)} = A/\{[1/(R+1)] \times \epsilon_{\beta LG}\} + \{[1-(1/R+1)\} \times \epsilon_{\alpha LA}\}$$

6. Concentration Of Unknown Sample
   a) Calculate the ratio of the two main first derivative peaks.

$$\mathring{A}_{293\,nm}/\mathring{A}_{286\,nm}$$

b) Use this value in the equation derived in step 3 above to determine R, the ratio $\alpha LA/\beta LG$.
   c) Calculate the soluble protein concentration, $c_{(sample)}$, in the undenatured reference sample as follows:

$$c_{(sample)} = A/\{[1/(R+1)] \times \epsilon_{\beta LG}\} + \{[1-(1/R+1)] \times \epsilon_{\beta LA}$$

7. Determination Of Degree Of Denaturation
   a) Calculate the percent denaturation relative to the reference sample as follows:

$$\%Denaturation = [(c_{(zero)} - c_{(sample)})/(c_{(zero)} - c_{(100\%)})] \times 100$$

Other embodiments and examples of the invention will be readily apparent to a person skilled in the art from the foregoing description of preferred embodiments and examples, the scope of the invention being defined in the following claims.

We claim:

1. A low or non-fat ice cream composition containing less than about 5% by weight fat and consisting essentially of (by weight except where stated) from about 5 to about 15% milk solids non-fat, from about 5 to about 20% sweeteners, from about 0.1 to about 0.5% stabilizers and, at a temperature in the range of from about $-12°$ to about $-10°$ C., from about 45 to about 60% frozen water in the form of ice crystals, at least about 40% (by number) of said ice crystals having a diameter less than about 45 microns, and from about 10 to about 20% unfrozen water wherein said low or non-fat ice cream has an ice crystallization profile similar to regular ice cream products.

2. A low or non-fat ice cream composition according to claim 1 wherein the ice cream contains from about 7 to about 11% milk solids non-fat.

3. A low or non-fat ice cream composition according to claim 1 wherein at least about 55% (by number) of said ice crystals have a diameter less than about 45 microns.

4. A process for producing low or non-fat ice cream comprising forming an aqueous ice cream mix containing (by weight solids) from about 2 to about 7% whey protein concentrate, said whey protein concentrate solids containing from about 30 to about 40% protein, and the mix also containing (by weight solids) from about 1 to about 10% skim milk solids, from about 5 to about 8% sucrose solids, from about 2 to about 6% corn syrup solids, from about 7 to about 12% high fructose corn syrup solids, from about 0.01 to about 0.05% carrageenin and from about 0.01 to about 0.25% guar gum, and processing said mix to form ice cream composition containing less than about 5% by weight fat and comprising (by weight except where stated) from about 5 to about 15% milk solids non-fat, from about 5 to about 20% sweeteners, from about 0.1 to about 0.5% stabilizers and, at a temperature in the range of from about −12° to about −10° C., from about 45 to about 60% frozen water in the form of ice crystals, at least about 40% (by number) of said ice crystals having a diameter less than about 45 microns, and from about 10 to about 20% unfrozen water wherein said low or non-fat ice cream has an ice crystallization profile similar to regular ice cream products.

5. A process according to claim 4 wherein the whey protein in the whey protein concentrate utilized in the mix is at least about 50% denatured relative to raw milk.

6. A process according to claim 5 wherein the whey protein of the whey protein concentrate utilized in the mix is denatured in the range of from about 50 to about 90% relative to raw milk.

7. A process according to claim 6 wherein the whey protein of the whey protein concentrate utilized in the mix is denatured in the range of from about 60 to about 80% relative to raw milk.

* * * * *